(12) United States Patent
Al-Omari et al.

(10) Patent No.: US 8,812,484 B2
(45) Date of Patent: Aug. 19, 2014

(54) SYSTEM AND METHOD FOR OUTER JOINS ON A PARALLEL DATABASE MANAGEMENT SYSTEM

(75) Inventors: Awny K Al-Omari, Cedar Park, TX (US); QiFan Chen, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 214 days.

(21) Appl. No.: 13/383,775

(22) PCT Filed: Mar. 30, 2010

(86) PCT No.: PCT/US2010/029205
§ 371 (c)(1),
(2), (4) Date: Jan. 12, 2012

(87) PCT Pub. No.: WO2011/123096
PCT Pub. Date: Oct. 6, 2011

(65) Prior Publication Data
US 2012/0117056 A1 May 10, 2012

(51) Int. Cl.
*G06F 7/00* (2006.01)
*G06F 17/30* (2006.01)

(52) U.S. Cl.
USPC .......................................... 707/714; 707/718

(58) Field of Classification Search
None
See application file for complete search history.

(56) References Cited

U.S. PATENT DOCUMENTS

| | | | |
|---|---|---|---|
| 6,289,334 B1 * | 9/2001 | Reiner et al. | 1/1 |
| 6,618,719 B1 * | 9/2003 | Andrei | 1/1 |
| 6,865,567 B1 | 3/2005 | Oommen et al. | |
| 7,343,370 B2 | 3/2008 | Kosuru et al. | |
| 7,512,600 B2 | 3/2009 | Al-Omari et al. | |
| 7,580,941 B2 | 8/2009 | Narasayya et al. | |
| 2004/0111410 A1 * | 6/2004 | Burgoon et al. | 707/4 |
| 2007/0043697 A1 * | 2/2007 | Driesch et al. | 707/2 |
| 2008/0222093 A1 * | 9/2008 | Fan et al. | 707/2 |
| 2008/0228710 A1 * | 9/2008 | Muras | 707/2 |
| 2009/0024568 A1 * | 1/2009 | Al-Omari et al. | 707/2 |
| 2009/0292668 A1 * | 11/2009 | Xu et al. | 707/2 |
| 2010/0057672 A1 * | 3/2010 | Zhou et al. | 707/2 |
| 2010/0122220 A1 * | 5/2010 | Ainsworth et al. | 715/866 |
| 2011/0047144 A1 * | 2/2011 | Han et al. | 707/718 |

OTHER PUBLICATIONS

PCT; "Notification of Transmittal of the International Search Report and the Written Opinion of the International Searching Authority, or the Declaration"; PCT/US2010/029205; mailed Dec. 30, 2010; 9 pages.
Xu et al., Efficient Outer Join Data Skew Handling in Parallel DBMS, In:VLDB 2009, Lyon France; ACM, Aug. 24-28, 2009.

* cited by examiner

Primary Examiner — Dung K Chau

(57) ABSTRACT

There is provided a computer-executable method of executing an outer join on a parallel database management system. An exemplary method comprises receiving an outer skewed values list (SVL). The outer SVL may comprise values that are indicated to be skewed. The exemplary method further comprises receiving an inner SVL. The inner SVL may comprise values that are indicated to be skewed. Additionally, the exemplary method comprises partitioning the outer table and the inner table across a plurality of join instances, based on the outer SVL and the inner SVL. A missing skew value is identified. The missing skewed value may be a value of the inner SVL that is not found in the inner table. The outer join is performed using the plurality of join instances, based on the missing skewed value.

20 Claims, 7 Drawing Sheets

SYSTEM AND METHOD FOR OUTER JOINS
ON A PARALLEL DATABASE MANAGEMENT
SYSTEM

BACKGROUND

In Massively Parallel Processing (MPP) systems, Business Intelligence (BI) and Enterprise Data Warehouse (EDW) applications process massive amounts of data. The data (a set of relational tables) resides in very large database systems that rely on a large number of central processing units (CPU) to efficiently execute database operations. MPP systems attempt to evenly distribute the data among the available processors and then perform the intended operation in parallel, instead of performing the operation serially.

One of the basic and most common database operations is the join between two relational tables. The join operator combines the records from both tables based on a matching criterion between columns in the tables. For example, the table LINEITEM can be joined to table PRODUCT by matching product_id columns on both tables to get a set of all line items with their product information. The join operation is often the most computationally expensive operation in the query execution tree, and its performance dictates the overall performance of the query.

To perform the join operation efficiently in parallel, the system partitions the data stream from both tables based on the value of the join column (product_id in the example above). That is, all records that have the same value of the join column from either table, or child, of the join are guaranteed to be sent to the same central processing unit (CPU). Hence, all join matches can be found locally in each CPU and independently of the other CPUs.

This partition-by-value scheme works well when records are distributed uniformly. The use of a good hash function ensures that distinct values are distributed uniformly (or pseudo-randomly) to all processors. However, a good hash function does not guarantee that records are distributed evenly since not all distinct values have the same occurrence frequency in the data set. The problem becomes evident when one value has an occurrence frequency higher than the average number of records per CPU. This is called data skew or skew. In the case of skew, the CPU selected by the frequent value will process a significantly higher number of records than average, which may significantly degrade the query response time.

BRIEF DESCRIPTION OF THE DRAWINGS

Certain exemplary embodiments are described in the following detailed description and in reference to the drawings, in which.

DETAILED DESCRIPTION

Figure 1A:
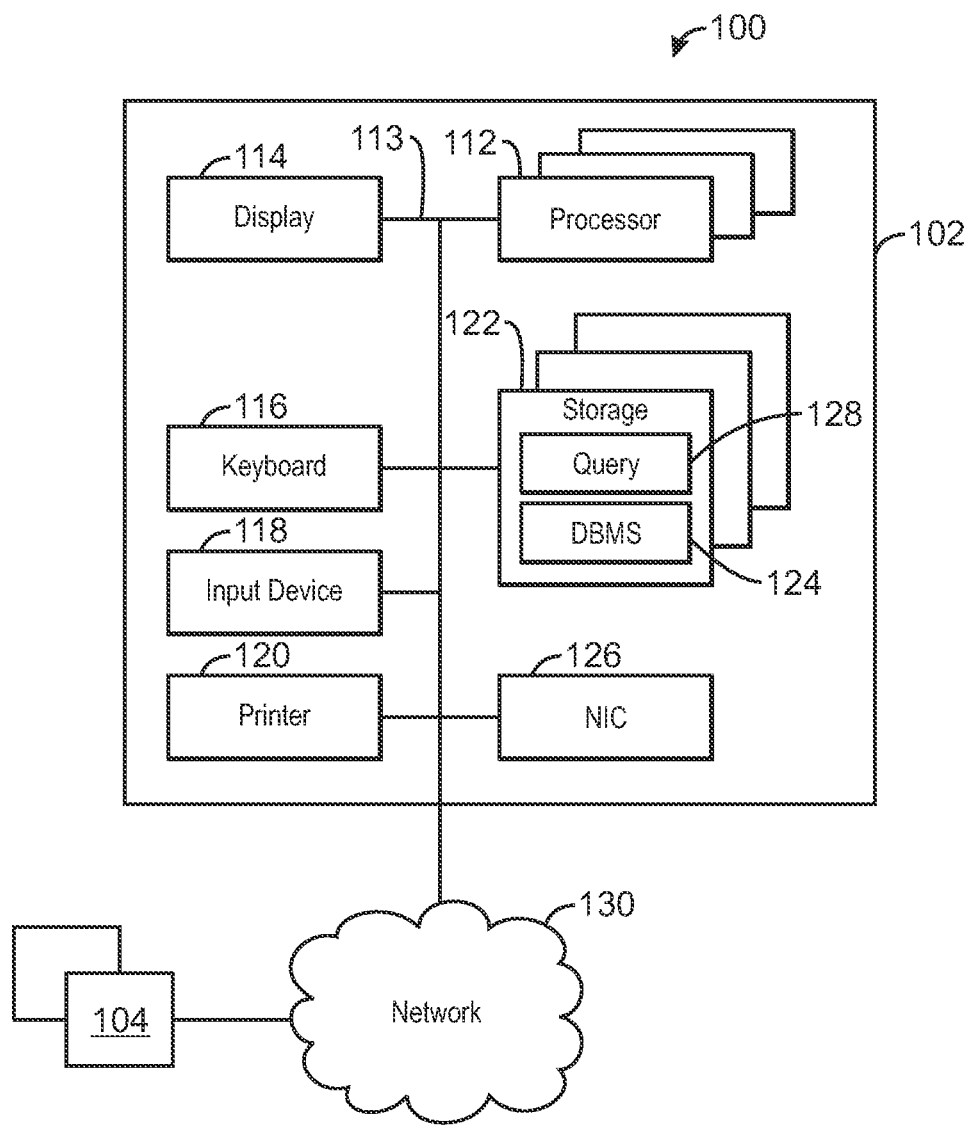
FIG. 1A is a block diagram of a system adapted to execute a query according to an exemplary embodiment of the present invention.

FIG. 1A is a block diagram of a system adapted to execute a query according to an exemplary embodiment of the present invention. The system is generally referred to by the reference number 100. Those of ordinary skill in the art will appreciate that the functional blocks and devices shown in FIG. 1 may comprise hardware elements including circuitry, software elements including computer code stored on a tangible, machine-readable medium or a combination of both hardware and software elements.

Additionally, the functional blocks and devices of the system 100 are but one example of functional blocks and devices that may be implemented in an exemplary embodiment of the present invention. Those of ordinary skill in the art would readily be able to define specific functional blocks based on design considerations for a particular electronic device.

The system 100 may include a database server 102, and one or more client computers 104, in communication over a network 130. As illustrated in FIG. 1A, the database server 102 may include multiple processors 112 acting in parallel. The processors 112 may be connected through a bus 113 to a display 114, a keyboard 116, one or more input devices 118, and an output device, such as a printer 120. The input devices 118 may include devices such as a mouse or touch screen.

In an exemplary embodiment of the invention, the system 100 may include multiple database servers 102 in a massively parallel processing system (MPP). In such an exemplary embodiment, the system 100 may include a shared nothing architecture.

The database server 102 may also be connected through the bus 113 to a network interface card (NIC) 126. The NIC 126 may connect the database server 102 to the network 130. The network 130 may be a local area network (LAN), a wide area network (WAN), or another network configuration, such as the Internet. The network 130 may include routers, switches, modems, or any other kind of interface device used for interconnection.

Through the network 130, several client computers 104 may connect to the database server 102. The client computers 104 may be similarly structured as the database server 102, with exception to the storage of a database management system (DBMS) 124. In an exemplary embodiment, the client computers 104 may be used to submit queries to the database server 102 for execution by the DBMS 124.

The database server 102 may have other units operatively coupled to the processor 112 through the bus 113. These units may include tangible, machine-readable storage media, such as storage devices 122.

The storage devices 122 may include media for the long-term storage of operating software and data, such as hard drives. The storage devices 122 may also include other types of tangible, machine-readable media, such as read-only memory (ROM), random access memory (RAM), and cache memory. The storage devices 122 may include the software used in exemplary embodiments of the present techniques.

The storage devices 122 may include the DBMS 124, a defaults table 129, and a query 128. The DBMS 124 may be a set of computer programs that controls the creation, maintenance, and use of databases by an organization and its end users. In an exemplary embodiment of the invention, the DBMS 124 may be a parallel DBMS. The DBMS 124 is described in greater detail with reference to FIG. 1B.

The query 128 may be any of a certain class of common database queries. More specifically, the query 128 may specify an OUTER JOIN operation. A JOIN operation may combine records from two or more database tables. The JOIN may combine fields from two tables by using values common to each. Two typical types of JOINs include inner and outer.

An inner join may create a result by combining column values of two tables based upon a join-predicate. The join predicate may specify a conditional expression for columns in both tables. Hereinafter the columns of the join predicate may be referred to individually as the join column. The inner join may compare the join column of a first table with the join column of a second table to find all pairs of rows which satisfy the join-predicate. When the join-predicate is satisfied, column values for each matched pair of rows may be combined into a result row. The following tables are used to further illustrate operation of the join:

TABLE 1

EMPLOYEE TABLE

| LAST_NAME | DEPT_ID |
|---|---|
| RAFFERTY | 31 |
| JONES | 32 |
| STEINBERG | 33 |
| ROBINSON | 33 |
| SMITH | 34 |
| JOHNSON | 35 |

TABLE 2

DEPARTMENT TABLE

| DEPT_ID | DEPT_NAME |
|---|---|
| 31 | SALES |
| 33 | ENGINEERING |
| 34 | CLERICAL |
| 35 | MARKETING |

TABLE 1 is an EMPLOYEE table that includes the LAST_NAME and DEPT_ID for 6 employees. TABLE 2 is a DEPARTMENT table that includes the DEPT_ID and DEPT_NAME for 4 departments. In this example, the DEPT_ID may be the join column.

As shown, TABLE 1 includes a DEPT_ID of "32" for EMPLOYEE "JONES." However, the DEPARTMENT table does not include a row for the DEPT_ID of "32."

Following is an example SQL of an inner join:
SELECT *
FROM EMPLOYEE INNER JOIN DEPARTMENT
ON EMPLOYEE.DEPT_ID=DEPARTMENT.DEPT_ID
SQL STATEMENT 1

When executed, the inner join specified in SQL STATEMENT 1 may create a result row for each pair of rows in the EMPLOYEE and DEPARTMENT tables where the DEPT_ID's are equal. For example, executing SQL STATEMENT 1 against the EMPLOYEE and DEPARTMENT tables specified above may generate the following result:

TABLE 3

INNER JOIN RESULT

| EMPLOYEE. LAST_NAME | EMPLOYEE. DEPT_ID | DEPARTMENT. DEPT_ID | DEPARTMENT. DEPT_NAME |
|---|---|---|---|
| RAFFERTY | 31 | 31 | SALES |
| STEINBERG | 33 | 33 | ENGINEERING |
| ROBINSON | 33 | 33 | ENGINEERING |
| SMITH | 34 | 34 | CLERICAL |
| JOHNSON | 35 | 35 | MARKETING |

As shown, each row in the EMPLOYEE table with a matching DEPARTMENT_ID in the DEPARTMENT table is represented in the result. Because the row for "JONES" in the EMPLOYEE table does not have a matching DEPARTMENT_ID ("32") in the DEPARTMENT table, there is no row in the result for "JONES."

An outer join, on the other hand, may create a result row for each row in one of the tables, regardless of whether a match exists in the join column. Outer joins that create a result row for one of the tables may be referred to as left joins and right joins. Left and right in this context may refer to which table the result rows are created for. Following are examples of SQL for a left join and a right join:

SELECT *
FROM EMPLOYEE LEFT JOIN DEPARTMENT
ON EMPLOYEE.DEPT_ID=DEPARTMENT.DEPT_ID
SQL STATEMENT 2

SELECT *
FROM EMPLOYEE RIGHT JOIN DEPARTMENT
ON EMPLOYEE.DEPT_ID=DEPARTMENT.DEPT_ID
SQL STATEMENT 3

The result of a left join for tables EMPLOYEE and DEPARTMENT always contains all records of the "left" table (EMPLOYEE), even if there is no match for the join column in the "right" table (DEPARTMENT). Similarly, the result of a right join for tables EMPLOYEE and DEPARTMENT always contains all records of the "right" table (DEPARTMENT), even if there is no match for the join column in the "left" table (EMPLOYEE).

The two tables of an outer join may also be referred to as the outer table and the inner table. In a left join, the outer table is the "left" table; the inner table is the "right" table. Similarly, in a right join, the outer table is the "right" table, while the inner table is the "left" table. For example, in SQL STATEMENT 2, the outer table is the EMPLOYEE table, and the inner table is the DEPARTMENT table.

If the join column for a row in the outer table does not match any rows in the inner table, the join will still return a row in the result. However, the result may include a NULL value for each column from the inner table. This means that an outer join returns all the values from the outer table, plus column values from the inner table (or NULL values in case of no matching join column). Additionally, if the outer table returns one row and the inner table returns more than one matching row for the join column, the column values in the outer table may be repeated for each distinct row on the inner table.

Consider the following example result of the outer join specified in SQL STATEMENT 2:

TABLE 4

OUTER JOIN RESULT

| EMPLOYEE.LAST_NAME | EMPLOYEE.DEPT_ID | DEPARTMENT.DEPT_ID | DEPARTMENT.DEPT_NAME |
|---|---|---|---|
| RAFFERTY | 31 | 31 | SALES |
| JONES | 32 | NULL | NULL |
| STEINBERG | 33 | 33 | ENGINEERING |
| ROBINSON | 33 | 33 | ENGINEERING |
| SMITH | 34 | 34 | CLERICAL |
| JOHNSON | 35 | 35 | MARKETING |

As shown, the result rows for RAFFERTY, STEINBERG, ROBINSON, SMITH, and JOHNSON include values from both the EMPLOYEE table and the DEPARTMENT table. For these rows, there is a match on the join column between the outer and inner tables. However, the result row for JONES includes NULL values for the columns in the DEPARTMENT table. This may indicate that DEPARTMENT table does not contain a row with a matching join column for DEPT_ID=32.

Figure 1B:
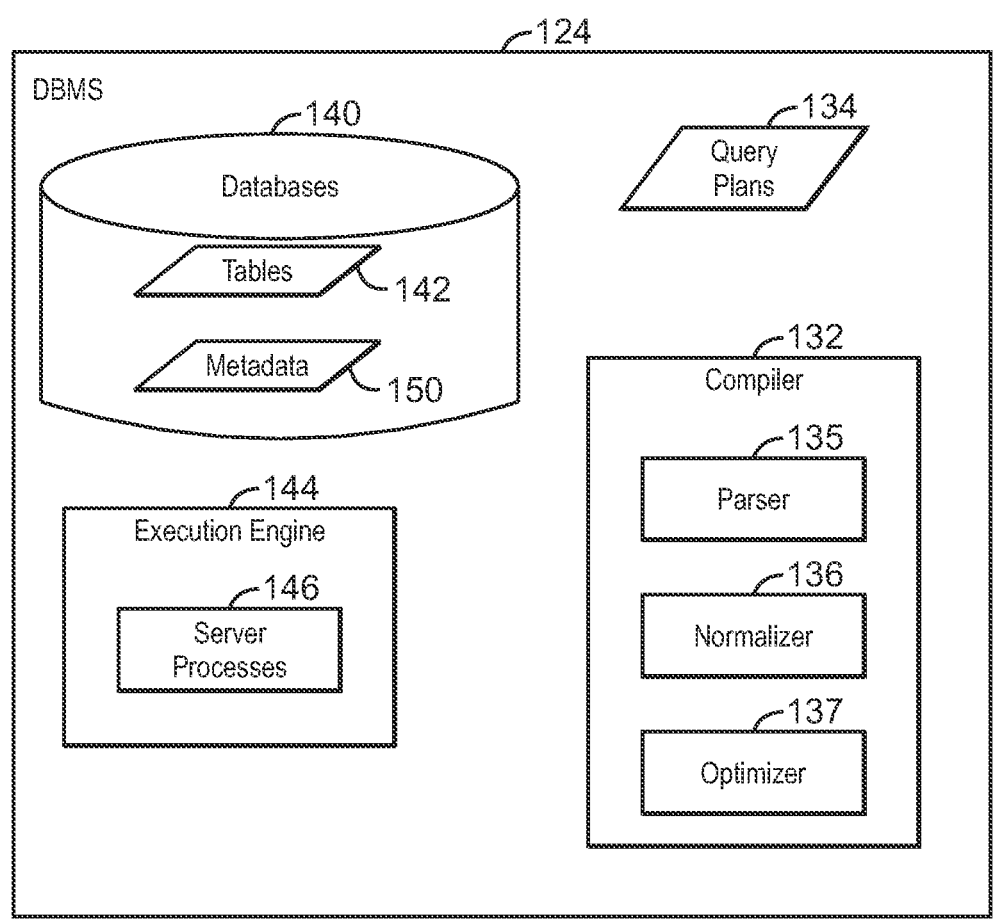
FIG. 1B is a block diagram of a parallel database management system adapted to execute a query according to an exemplary embodiment of the present invention.

FIG. 1B is a block diagram of a parallel database management system adapted to execute a query according to an exemplary embodiment of the present invention. As illustrated, the DBMS 124 may include a compiler 132, query plans 134, an execution engine 144, and several databases 140.

The query plans 134 may each specify alternate ways to perform the query 128. The compiler 132 may be software that generates the query plans 134, which are implemented at runtime by the execution engine 144.

The compiler 132 may consist of several modules, including, but not limited to, a parser 135, a normalizer 136, and an optimizer 137. Each of the modules may perform a separate phase of query plan generation.

In one phase, the parser 135 may perform syntax checking on the query 128. The parser 135 may also build a query tree, which may be an algebraic tree representation of the query 128. In another phase, a normalizer 136 may transform the query tree into a form for optimization, such as a canonical tree form.

In yet another phase, the optimizer 137 may generate several potential query plans 134 to determine the execution strategy for the query 128. The potential query plans 134 may be based on the query tree in the canonical tree form. The potential query plan 134 with the minimal processing cost may be selected for the execution strategy.

The databases 140 may include user data organized into tables, columns, and rows. The databases 140 may also include metadata 150. The metadata 150 may be a collection of statistics about the data in the databases. The metadata 150 may describe data values within the databases, the frequency of occurrence of particular values, and the like. Typically, the DBMS 124 updates the metadata 150 after data is loaded into the databases 140, or whenever the data in the databases 140 has changed substantially via insert, update, and delete operations.

The execution engine 144 may include server processes 146. Operations within the query plan 134 may be delegated to one or more of the server processes 146, each of which may execute a subset of the query plan 134 on some partition of data. In an embodiment comprising the MPP, each of the server processes 146 may execute in parallel on different processors 112. Hereinafter, each of the server processes 146 is referred to as a join instance.

Figure 2:
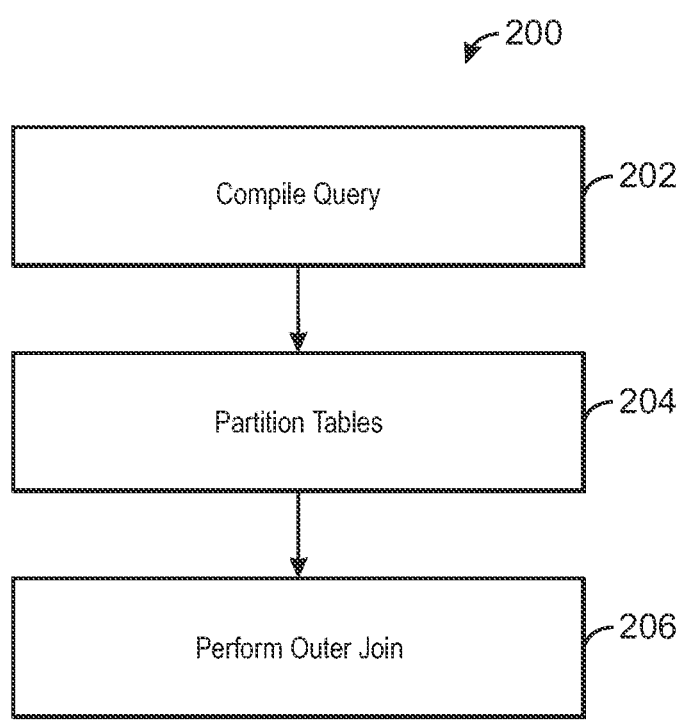
FIG. 2 is a process flow diagram of a computer-executable method for executing an outer join on a parallel DBMS according to an exemplary embodiment of the present invention.

FIG. 2 is a process flow diagram of a computer-executable method for executing an outer join on a parallel DBMS according to an exemplary embodiment of the present invention. The method is generally referred to by the reference number 200, and may be performed by the DBMS 124. It should be understood that the process flow diagram for method 200 is not intended to indicate a particular order of execution.

The method begins at block 202. At block 202, the compiler 132 may compile the query 128 by generating the query plan 134 for the query 128. The query plan 134 may specify multiple join instances to perform the outer join.

As stated previously, the query 128 may specify an outer join of an outer table and an inner table. The query 128 may also specify a predicate that specifies a join column of each of the outer table and the inner table. The outer table and the inner table may be joined based on common values in the join column.

At block 204, the execution engine 144 may partition each of the outer and inner tables. In an exemplary embodiment of the invention, the tables may be partitioned in a manner that mitigates data skew. The partitioning is described in greater detail with reference to FIG. 4.

At block 206, the execution engine 144 may perform the outer join. The outer join may be performed by multiple join instances, each operating on a separate partition of the outer and inner tables.

Figure 3:
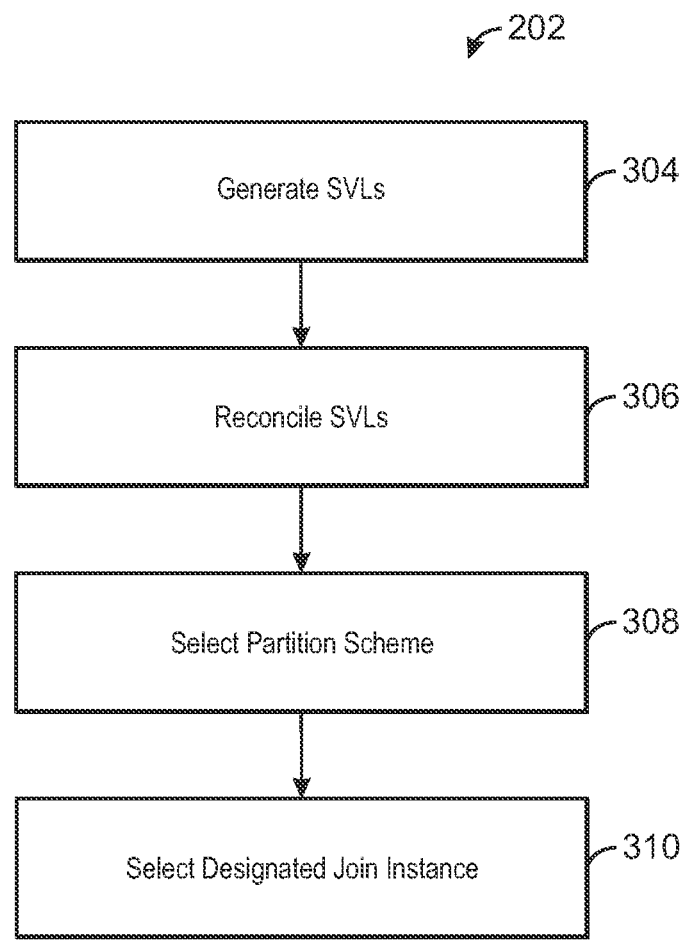
FIG. 3 is a process flow diagram of a computer-executable method for compiling the query 128 according to an exemplary embodiment of the present invention.

FIG. 3 is a process flow diagram of a computer-executable method for compiling the query 128 according to an exemplary embodiment of the present invention. The method is generally referred to by the reference number 202, and may be performed by the compiler 132. It should be understood that the process flow diagram for method 202 is not intended to indicate a particular order of execution.

The method begins at block 304. At block 304, the compiler 132 may build an outer skewed values list (SVL), and an inner SVL. The outer SVL may include values that the metadata 150 indicates are skewed within the outer table. Similarly, the inner SVL may include values that the metadata 150 indicates may be skewed within the inner table.

The SVLs may be built during the query optimization phase of the compile. For each of the outer table and inner table, the query optimizer 137 may identify and store all column values (in the join column) that have an occurrence frequency higher than a specified threshold. The threshold may be such that the SVLs only include values capable of significantly distorting the uniform data distribution. In an exemplary embodiment of the invention, the threshold may equal $$\frac{RC}{JI},$$

where RC represents the total number of rows in the table, and JI represents the total number of join instances for performing the query 128.

The query optimizer 137 may retrieve the metadata 150 for the outer and inner tables, including the most frequent values and their frequencies. During the optimization process, the optimizer 137 may propagate this metadata 150, as part of the column statistics, and adjust the metadata throughout the query plan tree. When choosing the query plan 134, the optimizer 137 may analyze the metadata 150 for each of the join children and compute the outer and inner SVLs.

At block 306, the optimizer may reconcile the two SVLs to make sure the two lists have no overlapping elements. If a value appears in both lists, the optimizer 137 may delete the value from one of the lists and retain it in the list where the value has a higher frequency.

At block 308, the optimizer 137 may select a partitioning scheme for the query plan 134. The optimizer 137 may choose the standard partitioning-by-value scheme if the metadata indicates that there is not significant skew (i.e. both SVLs are empty).

On the other hand, if skew is detected, the optimizer 137 may insert two special distribution operators (i.e., exchange operators) between the join operator and the join operator's children. The SVLs may be propagated and stored in both exchange nodes on the left and right children of the join operator.

At block 310, the optimizer may select one of the parallel join instances. The selected join instance may be designated to be the only join instance that generates null-instantiating result rows for missing skew values. In another embodiment of the invention, the designated join instance may be selected by the execution engine 144 during execution of the query plan 134.

Figure 4:
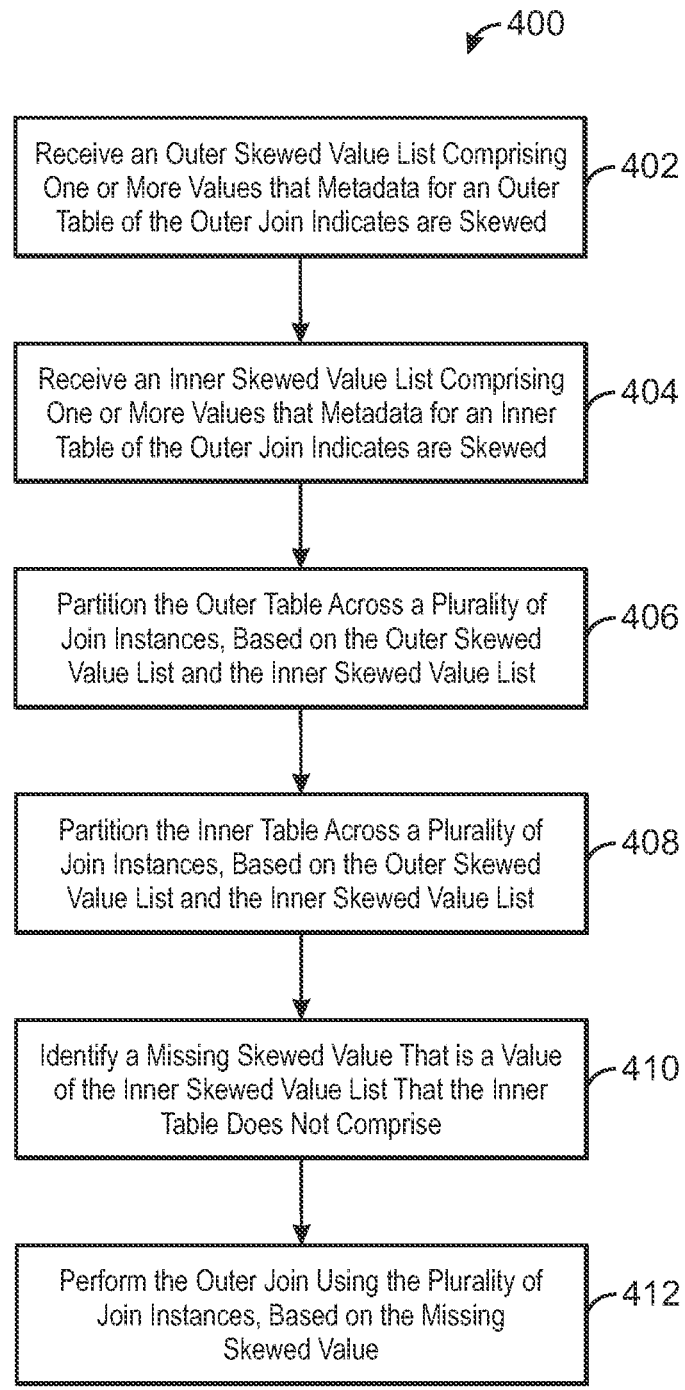
FIG. 4 is a process flow diagram of a computer-executable method for executing an outer join on a parallel DBMS according to an exemplary embodiment of the present invention.

FIG. 4 is a process flow diagram of a computer-executable method for executing an outer join on a parallel DBMS according to an exemplary embodiment of the present invention. The method is generally referred to by the reference number 400, and may be performed by the execution engine 144. It should be understood that the process flow diagram for method 400 is not intended to indicate a particular order of execution.

The method 400 begins at block 402. At block 402, the execution engine 144 may receive the outer SVL. As stated previously, the outer SVL may include one or more skewed values for the join column of the outer table, according to the metadata 150. At block 404, the execution engine 144 may receive the inner SVL, which may include one or more skewed values for the join column of the inner table.

At block 406, the execution engine 144 may partition the outer table across the plurality of join instances. The partitioning may be based on the outer SVL and the inner SVL. During query execution, the exchange operator for the outer table may build two hash tables: one for the outer SVL, and one for the inner SVL.

Every row of the outer table may be checked against the SVLs. If the join column value for the row is not in either SVL, the row may be assigned to the join instance assigned for this particular value, based on a standard partitioning-by-value scheme.

If the join column value for the row is in the outer SVL, the row has one of the skew values in the data set processed by this exchange operator. Consequently, the row may be assigned to any of the join instances based on a uniform distribution function, such as random or round-robin.

If the join column value for the row is in the inner SVL, this row has one of the skew values in the data set processed by the other child exchange operator. Accordingly, a copy of the row may be assigned to all the join instances.

At block 408, the execution engine 144 may partition the inner table across the plurality of join instances. The partitioning may be based on the outer SVL and the inner SVL.

The inner table may be partitioned according to the same process described in block 406. For example, if the join column value for a row is not in either SVL, the row may be assigned to the join instance assigned for this particular value, based on a standard partitioning-by-value scheme. However, the roles of the outer SVL and the inner SVL may be reversed.

If the join column value for the row is in the inner SVL, the row has one of the skew values in the data set processed by this exchange operator. Consequently, the row may be assigned to any of the join instances based on a uniform distribution function, such as random or round-robin. Additionally, the exchange node may mark the value in the inner SVL as found.

If the join column value for the row is in the outer SVL, then the row has one of the skew values in the data set processed by the other child exchange operator of the join. Accordingly, the row may be copied to all the join instances.

At block 410, the execution engine may identify the missing skewed values of the inner table. The missing skewed values may be the values left unmarked after the partitioning is complete. If a value in the inner SVL is left unmarked, the inner table may not include a row with the unmarked value. In other words, the metadata 150 used to generate the SVLs may be outdated by the time the rows are processed by the execution engine 144.

At block 412, the execution engine 144 may perform the outer join specified in the query 128. Each of the join instances may generate results based on the particular partition of data assigned. Additionally, the join instance designated to generate null-instantiated rows for missing skewed values may generate results based on the missing skewed values.

Figure 5:
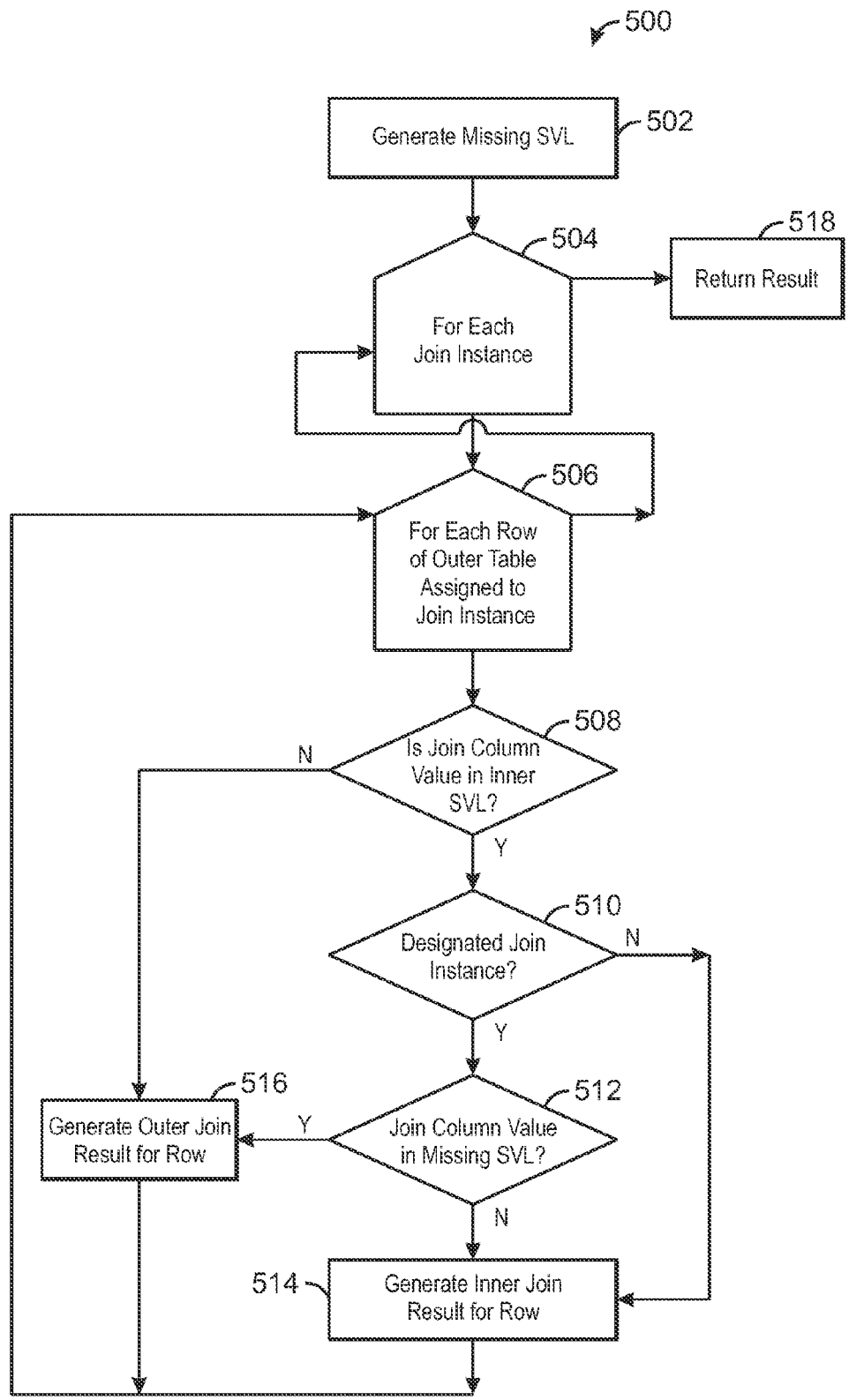
FIG. 5 is a process flow diagram of a computer-executable method for executing an outer join on a parallel DBMS according to an exemplary embodiment of the present invention.

FIG. 5 is a process flow diagram of a computer-executable method for executing an outer join on a parallel DBMS according to an exemplary embodiment of the present invention. The method is generally referred to by the reference number 500, and may be performed by the execution engine 144. It should be understood that the process flow diagram for method 500 is not intended to indicate a particular order of execution.

The method 500 begins at block 502. At block 502, the execution engine 144 may generate the missing SVL. After processing its last record, the exchange operator partitioning the inner table records may send the list of all values in the inner SVL that were not found to the designated null-instantiation join instance. The designated join instance may generate the missing SVL by comparing "unfound" values from all the partitioning nodes to determine the values that are truly missing. The values that are missing are only those that were not found by any of the partitioning nodes.

Blocks 504-516 may be repeated for each join instance. At block 518, the result of the outer join may be returned. Blocks 506-516 may be repeated for each row in the outer table assigned to the join instance.

At block 508, the execution engine may determine whether the value of the join column for a row is in the inner SVL. If not, at block 516, the execution engine 144 may generate a result similar to that of a regular outer join operation for the current row in the outer table.

If the value of the join column is in the inner SVL, at block 510, the execution engine 144 may determine whether this is the designated join instance. If not, non null-instantiated results may be generated for this row. Accordingly, at block 514, the execution engine may generate a result similar to that of an inner join operation for the current row of the outer table.

If this is the designated join instance, at block 512, the execution engine 144 may determine whether the join column value is in the missing SVL. If not, block 514 may be performed.

If the join column value is in the missing SVL, a null-instantiated row may be generated. Accordingly, at block 516, the execution engine may generate a result similar to that of an outer join for the current row of the outer table.

Figure 6:
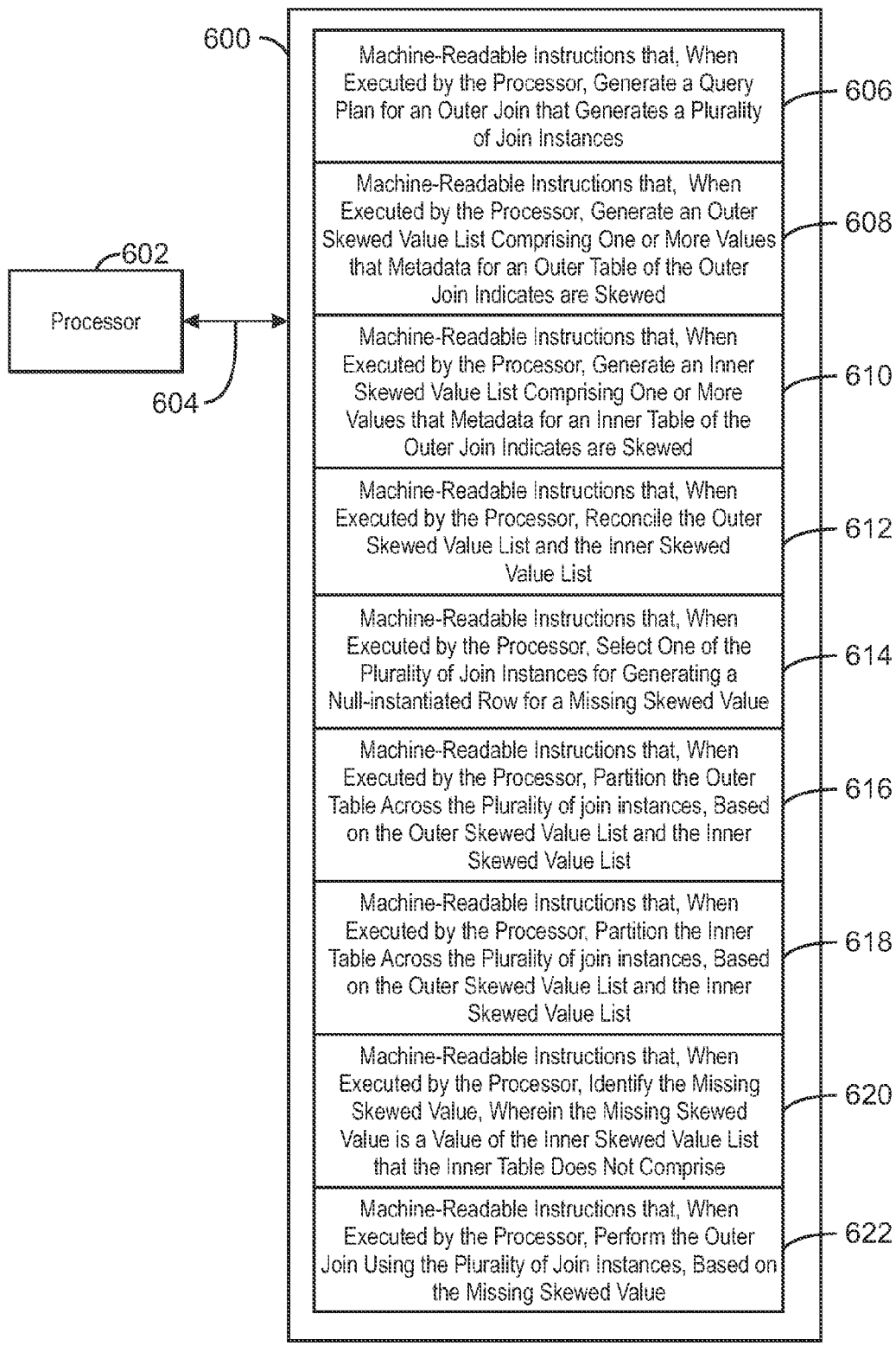
FIG. 6 is a block diagram showing a tangible, machine-readable medium that stores code adapted to execute an outer join on a parallel DBMS according to an exemplary embodiment of the present invention.

FIG. 6 is a block diagram showing a tangible, machine-readable medium that stores code adapted to execute an outer join on a parallel DBMS according to an exemplary embodiment of the present invention. The tangible, machine-readable medium is generally referred to by the reference number 600. The tangible, machine-readable medium 600 may correspond to any typical storage device that stores computer-executable instructions, such as programming code or the like.

Moreover, tangible, machine-readable medium 600 may be included in the storage 122 shown in FIG. 1. When read and executed by a processor 602, the instructions stored on the tangible, machine-readable medium 600 are adapted to cause the processor 602 to execute the query 128.

A region 606 of the tangible, machine-readable medium 400 stores machine-readable instructions that, when executed by the processor 602, generate a query plan for an outer join that generates a plurality of join instances.

A region 608 of the tangible, machine-readable medium 600 stores machine-readable instructions that, when executed by the processor 602, build an outer SVL. The outer SVL may comprise one or more values that the metadata 150 for the outer table of the outer join indicates are skewed.

A region 610 of the tangible, machine-readable medium 600 stores machine-readable instructions that, when executed by the processor 602, build an inner SVL. The inner SVL may comprise one or more values that the metadata 150 for the inner table of the outer join indicates are skewed.

A region 612 of the tangible, machine-readable medium 600 stores machine-readable instructions that, when executed by the processor 602, reconcile the outer SVL and the inner SVL.

A region 614 of the tangible, machine-readable medium 600 stores machine-readable instructions that, when executed by the processor 602, select one of the plurality of join instances for generating a null-instantiated row for a missing skewed value.

A region 616 of the tangible, machine-readable medium 600 stores machine-readable instructions that when executed by the processor, partition the outer table across the plurality of join instances, based on the outer SVL and the inner SVL.

A region 618 of the tangible, machine-readable medium 600 stores machine-readable instructions that when executed by the processor, partition the inner table across the plurality of join instances, based on the outer SVL and the inner SVL.

A region 620 of the tangible, machine-readable medium 600 stores machine-readable instructions that when executed by the processor, identify the missing skewed value. The missing skewed value is a value of the inner SVL that is not present in the inner table.

A region 622 of the tangible, machine-readable medium 600 stores machine-readable instructions that when executed by the processor, perform the outer join using the plurality of join instances, based on the missing skewed value.

What is claimed is:

1. A computer-executable method of executing an outer join on a parallel database management system, comprising:
   receiving an outer skewed values list (SVL) comprising one or more values that are indicated for an outer table of the outer join to be skewed;
   receiving an inner SVL comprising one or more values that are indicated for an inner table of the outer join to be skewed;
   partitioning the outer table across a plurality of join instances, based on the outer SVL and the inner SVL;
   partitioning the inner table across the plurality of join instances, based on the outer SVL and the inner SVL;
   identifying a missing skewed value that is a value of the inner SVL that is not found in the inner table; and
   performing the outer join using the plurality of join instances, based on the missing skewed value.

2. The computer-executable method of claim 1, wherein performing the outer join comprises generating a null-instantiated row for the missing skewed value using only one join instance of the plurality of join instances.

3. The computer-executable method of claim 2, comprising selecting the only one join instance.

4. The computer-executable method of claim 2, wherein generating the null-instantiated row comprises:
   selecting an outer row of the outer table;
   determining that the outer row comprises the missing skewed value; and
   generating a result row comprising a join column value for the outer table and a null value for the inner table.

5. The computer-executable method of claim 4, comprising generating a hash table that comprises the inner SVL, wherein determining that the outer row comprises the missing skewed value is based on the hash table.

6. The computer-executable method of claim 1, comprising compiling the query, wherein compiling the query comprises generating a query plan that receives the outer SVL, receives the inner SVL, partitions the outer table, partitions the inner table, identifies the missing skewed value, and performs the outer join.

7. The computer-executable method of claim 6, wherein compiling the query comprises selecting the only one join instance.

8. The computer-executable method of claim 6, wherein compiling the query comprises:
   generating the inner SVL;
   generating the outer SVL; and
   reconciling the inner SVL and the outer SVL.

9. The computer-executable method of claim 8, wherein reconciling the inner SVL and the outer SVL comprises:
   identifying a common value of the outer SVL and the inner SVL; and
   removing the common value from one of the inner SVL and the outer SVL based on whether the common value occurs in the inner table or the outer table with a lesser frequency.

10. The computer-executable method of claim 1, wherein partitioning the outer table comprises at least one of:
    assigning a copy of an outer row of the outer table to all of the plurality of join instances;
    assigning the outer row to one of the plurality of join instances based on a uniform distribution algorithm; and
    assigning the outer row to the one of the plurality of join instances based on a partition-by-value algorithm.

11. A computer system for executing an outer join on a parallel database management system (DBMS), the computer system comprising:
    multiple processors execute stored instructions; and
    a memory device that stores instructions, the memory device comprising:
    the parallel DBMS;
    computer-executable code compiles a query specifying the outer join;
    computer-executable code receives an outer skewed values list (SVL) comprising one or more values for an outer table of the outer join that are indicated to be skewed;

computer-executable code receives an inner SVL comprising one or more values for an inner table of the outer join that are indicated to be skewed;

computer-executable code partitions the outer table across a plurality of join instances, based on the outer SVL and the inner SVL;

computer-executable code partitions the inner table across the plurality of join instances, based on the outer SVL and the inner SVL;

computer-executable code identifies a missing skewed value that is a value of the inner SVL that is not present in the inner table; and computer-executable code performs the outer join using the plurality of join instances, based on the missing skewed value.

12. The computer system of claim 11, wherein the computer-executable code compiles the query comprises computer-executable code selects one of the plurality of join instances for generating a null-instantiated row for the missing skewed value.

13. The computer system of claim 12, wherein the computer-executable code performing the outer join comprises computer-executable code generating the null-instantiated row for the missing skewed value using only the selected one of the plurality of join instances.

14. The computer system of claim 13, wherein the computer-executable code generating the null-instantiated row comprises computer-executable code:

selecting an outer row of the outer table;

determining that the outer row comprises the missing skewed value; and generating a result row comprising a join column value for the outer table and a null value for the inner table.

15. The computer system of claim 14, wherein the computer-executable code determining that the outer row comprises the missing skewed value comprises computer-executable code:

generating a hash table that comprises the inner SVL; and determining that the outer row comprises a value of the inner SVL based on the hash table.

16. The computer system of claim 11, comprising computer-executable code reconciling the inner SVL and the outer SVL.

17. The computer system of claim 16, wherein the computer-executable code reconciling the inner SVL and the outer SVL comprises computer-executable code:

identifying a common value between the inner SVL and the outer SVL;

removing the common value from one of the inner SVL and the outer SVL based on whether the common value occurs in the inner table or the outer table with a greater frequency.

18. The computer system of claim 11, wherein the computer-executable code partitioning the inner table comprises computer-executable code:

assigning a copy of an outer row of the outer table to all of the plurality of join instances;

assigning the outer row to one of the plurality of join instances based on a uniform distribution algorithm;

assigning the outer row to the one of the plurality of join instances based on a partition-by-value algorithm; or combinations thereof.

19. A non-transitory machine-readable medium that stores machine-readable instructions executable by a processor to execute a query, the non-transitory machine-readable medium comprising:

machine-readable instructions that when executed by the processor, generate a query plan for an outer join that generates a plurality of join instances;

machine-readable instructions that when executed by the processor, generate an outer skewed values list (SVL) comprising one or more values that are indicated for an outer table of the outer join to be skewed;

machine-readable instructions that when executed by the processor, generate an inner SVL comprising one or more values that are indicated for an inner table of the outer join to be skewed;

machine-readable instructions that when executed by the processor, reconcile the outer SVL and the inner SVL;

machine-readable instructions that when executed by the processor, select one of the plurality of join instances for generating a null-instantiated row for a missing skewed value;

machine-readable instructions that when executed by the processor, partition the outer table across the plurality of join instances, based on the outer SVL and the inner SVL;

machine-readable instructions that when executed by the processor, partition the inner table across the plurality of join instances, based on the outer SVL and the inner SVL;

machine-readable instructions that, when executed by the processor, identify a missing skewed value that is a value of the inner SVL that is not present in the inner table; and machine-readable instructions that, when executed by the processor, perform the outer join using the plurality of join instances, based on the missing skewed value.

20. The non-transitory, machine-readable medium of claim 19, wherein machine-readable instructions that, when executed by the processor, perform the outer join, comprise machine-readable instructions that, when executed by the processor, generate a null-instantiated row for the missing skewed value using the selected one of the plurality of join instances.

* * * * *